Figure 1:
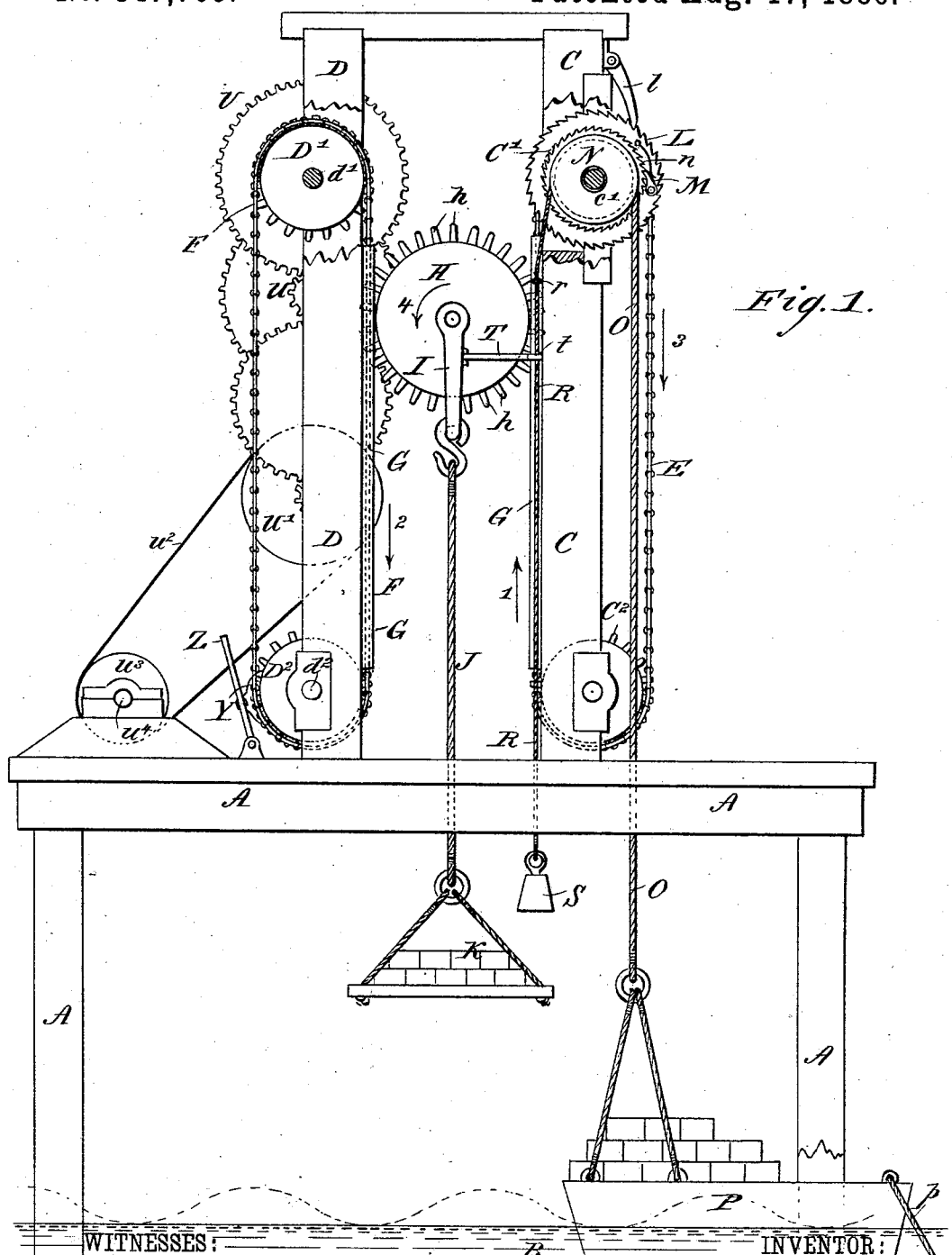

(No Model.) 2 Sheets—Sheet 1.

I. ST. C. GOLDMAN.
MOTOR.

No. 347,705. Patented Aug. 17, 1886.

WITNESSES: Dom Turtchell, C. Sedgwick

INVENTOR: I. St. C. Goldman

BY Munn & Co.
ATTORNEYS.

(No Model.) 2 Sheets—Sheet 2.
I. ST. C. GOLDMAN.
MOTOR.
No. 347,705. Patented Aug. 17, 1886.
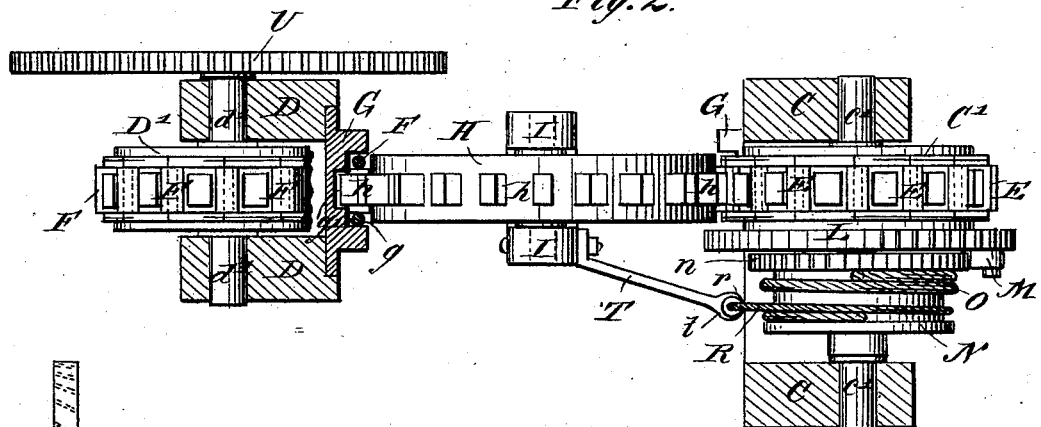
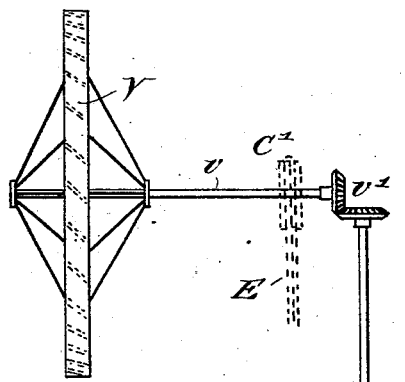
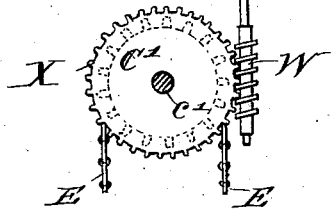
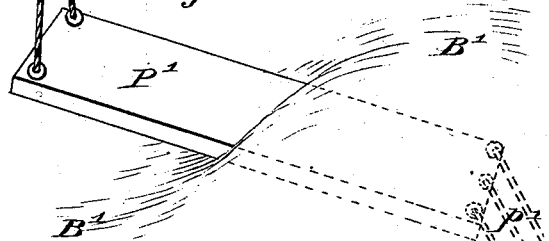
WITNESSES:
Dom Twitchell
C. Sedgwick
INVENTOR:
I. St. C. Goldman
BY Munn & Co.
ATTORNEYS.

UNITED STATES PATENT OFFICE.

ISAAC ST. CLAIR GOLDMAN, OF PASADENA, CALIFORNIA.

MOTOR.

SPECIFICATION forming part of Letters Patent No. 347,705, dated August 17, 1886.

Application filed December 7, 1885. Serial No. 185,004. (No model.)

*To all whom it may concern:*

Be it known that I, ISAAC ST. CLAIR GOLDMAN, of Pasadena, in the county of Los Angeles and State of California, have invented a new and Improved Motor, of which the following is a full, clear, and exact description.

The object of my invention is to provide a simple and effective motor, comparatively inexpensive in construction and operation, and adapted to store up power regularly or irregularly applied to it from a prime mover, which may be operated by water or wind power, and to transmit the stored power steadily with any desired degree of force to driving mechanism adapted to operate any kind of machinery.

The invention consists in a motor comprising two endless traveling chains or belts and a power-wheel held loosely in and engaging both chains or belts and adapted to rise and fall in and between the chains or belts, whereby the power transmitted to one endless chain or belt by a prime mover will be transmitted through the power-wheel and the other endless chain or belt to any approved driving mechanism to which the machinery to be driven may be connected.

The invention consists, also, in various novel features of construction and combination of parts of the motor, all as hereinafter fully set forth.

Reference is to be had to the accompanying drawings, forming part of this specification, in which similar letters of reference indicate corresponding parts in all the figures.

Figure 1 is an elevation, partly broken away and in section, of my improved motor as arranged for operation by the rise and fall of waves. Fig. 2 is a horizontal sectional view in larger size and with one of the chain-wheels and chains partly broken away the better to show the adjacent chain and power wheel guide. Fig. 3 is a detail view illustrating a raft which may be used to transmit the power of the surf to the motor mechanism, and Fig. 4 illustrates how the power of the wind may be transmitted to the motor mechanism. Fig. 5 shows means for limiting the rise of the power-wheel when wind is used as a motive power.

I first will describe the motor as adapted to receive, store up, and transmit the power of water due to the action of waves and surf, and as represented in Figs. 1, 2, and 3 of the drawings.

On any suitable pier or structure, A, built in and over water B, having a rise and fall or wave action, are erected opposite pairs of posts C C and D D, which may be braced to each other and to the pier A in any suitable manner, to give them sufficient strength to support the mechanism of the motor. The pair of posts C C are spaced apart for most of their length for a distance a little greater than the width of the endless chain E, which passes over chain-wheels $C'$ $C^2$, journaled, respectively, at the tops and bottoms of the posts, the front post C being offset outward at the top to give room for the gearing operating next the chain-wheel $C'$, to receive and store up the power, as presently explained. The pair of posts D D are spaced apart their whole height for a distance sufficient to receive between them the upper and lower chain-wheels, $D'$ $D^2$, which are journaled, respectively, at the tops and bottoms of the posts, and around which wheels passes the endless chain F, which faces the chain E and delivers or gives off the power as needed, and as presently described.

To the inner edges of the opposite pairs of posts are fixed the vertical guides G G, which have shallow central face-grooves, $g$, in which the opposite endless chains E F run and are guided, and also have deeper central grooves, $g'$, in which the teeth $h$ of the main power-wheel H move to guide the power-wheel, the teeth of which engage the opposite chains E F, which thus support the power-wheel loosely between them. The shaft of the power-wheel H is hung in a stirrup, I, from which is suspended by suitable cables or chains, J, the heavy weight K, which may consist of a weighted platform, as shown, or may be a solid or sectional weight of any kind, and which constantly tends to draw the power-wheel downward bodily. The chain-wheel $C'$ has fixed to it the ratchet-wheel L, with which a pawl, $l$, pivoted to one of the post C engages, and to the wheel L is held a spring-pressed pawl, M, which normally engages a ratchet, $n$, formed on or fixed to a barrel, N, which is placed loosely on the shaft $c'$ of the chain-wheel $C'$.

To the barrel N is fixed one end of a rope or cable, O, to the other end of which is suspended or held a weighted vessel, P, which floats on the water under the pier A, and rises and falls with the waves or tide, and which may be anchored in position by slack ropes or chains p. (See Fig. 1.) To the barrel N also is fixed one end of a rope, R, to the other end of which is attached a weight, S, sufficiently heavy to turn the barrel N back to wind the slack of the rope or cable O on the barrel as the float P rises, the ropes O R being wound around the barrel in reverse directions. The rope R passes through an eye, $t$, on the end of an arm, T, which is fixed to the stirrup I, and travels up and down with the power-wheel H, and in order to prevent the power-wheel from rising into contact with the opposite upper chain-wheels, C' D', I provide a knot at $r$ in the rope R, or a stop of any kind may be fixed to the rope in the position shown for the knot, so that as the power-wheel rises nearly to its extreme limit of motion, the eye $t$ of the arm T will strike the knot $r$, or an equivalent stop, and lift the weight S to prevent the backward turning of the barrel N, and consequently prevent the winding of the cable E onto the barrel, and thus allow the weighted float P to rise and fall with the water without effect to turn the barrel forward, and as will be hereinafter more fully explained.

To the shaft $d'$ of the chain-wheel D' is fixed a gear-wheel, U, with which is connected a train of speed-multiplying gears, $u$, which give motion to a pulley, $u'$, over which a belt, $u^2$, passes to a pulley, $u^3$, on a shaft, $u^4$, from which the power may be taken to operate machinery of any kind.

The continuous operation of the motor is as follows: As the float P is lifted by the rise of the water B, the rope or cable O will slacken and the weight S will pull the rope R downward, and thereby turn the barrel N backward and wind the slack of the rope O thereon, as the barrel-ratchet $n$ turns freely under the pawl M, the ratchet-wheel L, the chain-wheel C', and the chain E meanwhile remaining at rest. When the float P falls with the water-level, the superior weight of the float will turn the barrel forward, and the barrel-ratchet $n$ then will engage the pawl M on the ratchet-wheel L, fixed to chain-wheel C', whereby the chain E will be carried around the wheels C' C², and its inner side will travel upward in the direction of the arrow 1 in Fig. 1 as long as the descent of the float continues, the rope G being meanwhile wound upon the barrel N, and the pawl $l$ will engage the ratchet L to prevent backslip of the chain E when the float next rises with the water, when the weighted rope R S again will turn the barrel N backward to wind the rope or chain O on the barrel prior to the next descent of the float to again turn the chain E, as above described.

It is obvious that as the inner side of the chain E rises it will have a tendency to turn the loose power-wheel H, and cause it to travel upward in and between the opposite chains E F, and as the weight K draws on the wheel H the latter will bear downward on the chain F, and cause the inner side of this chain to move downward in the direction of arrow 2, thereby giving rotation to the chain-wheel D', and through it to the gear-wheel U and the multiplying and driving gear to the shaft $u^4$. Should the power transmitted to the chain E exceed that being taken off or transmitted by the chain F and the connected gearing, the power-wheel H will gradually rise between the chains E F; and should this excess of power continue until the wheel H is quite at its full height the eye $t$ of the stirrup-arm T will strike and raise the knot or stop $r$, and thereby lift the rope R and its weight S, to prevent the turning back of the barrel N as the float P rises. Consequently the rope O will not at such time be wound on the barrel, and the chain E will not be operated from the barrel, as power will not then be transmitted from the rising and falling float P to the chain; hence the wheel H cannot be lifted into contact with the upper opposite chain-wheels, C' D'. The pawl $l$, acting in the ratchet L, fixed to the chain-wheel C', prevents the backward movement of the chain E, which turns only in the direction indicated by the arrows 1 and 3; and when the power-wheel H is at its extreme height, and power is no longer transmitted to the chain E from the float P, the power-wheel still may rotate in direction of its arrow 4 and turn the power-transmitting chain F, as the weight K draws the power-wheel downward until the eye $t$ of the stirrup-arm T descends to allow the weighted rope R S again to wind the rope O onto the barrel N as the float P rises. Should the power transmitted from the chain F be in excess of that transmitted to the chain E after the wheel H has been raised, the wheel will steadily fall until it is fully down to the bottom of the guides G, where it will be stopped by and will rest on any suitable support, holding it out of contact with the lower chain-wheels, C² D². The posts C D may have any desired height, and the chains E F may have any desired length to give any preferred range of vertical travel to the power-wheel H, and the weight K may be lighter or heavier to steadily transmit any given amount of power through the wheel H to the chain F and the machinery to be driven. Whether the power-wheel H is rising or falling in and between the endless chains E F, which support it, the wheel will constantly transmit a steady regular power to the chain F, no matter how irregularly the chain E may be operated by the float P, or by any other power applied to either of the chain-wheels C' C² or to the chain itself.

In Fig. 3 the rope O is shown attached to one end of a raft, P', the other end of which is anchored by ropes $p'$ to the bottom, over which the surf B' washes, and whereby, when waves move inshore, the raft will be swung down to draw on the rope and turn the chain E to lift the power-wheel H, and as the waves recede the raft will be lifted to slacken the rope O, and permit the rope G to turn the barrel N backward to wind the rope O thereon, substantially as hereinbefore described. This arrangement of a surf-raft will be useful for small powers.

Fig. 4 illustrates how the shaft $v$ of a wind-wheel, V, may be geared by bevel-wheels $v'$ with a shaft, $w$, carrying a worm, W, which meshes with a worm-wheel, H, to which the upper wheel, C', of the chain E is fixed, and whereby the wind-wheel V is geared to the chain E, so that the wind-wheel may be allowed to run night and day to lift the power-wheel H, with which may be connected a rope or other device to stop the wind-wheel when the power-wheel is at its maximum height. The means I prefer to use for this purpose is shown in Fig. 5, wherein a rope, $a$, provided with a stop, $a'$, is secured to the upper portion of the structure, passes down through the eye $t$ in the arm T, projecting from the stirrup I, thence down and around the pulley $b$, journaled in the posts C, then upward, and is to be connected to the mechanism which throws the wheel out of the wind.

The operation is as follows: As the power-wheel rises, the eye of the arm T comes in contact with the stop $a'$ of the rope $a$, and draws the rope in the direction of the arrow 4, whereby the wheel will be thrown out of the wind and the mill stopped, when the power-wheel will descend and the mill again be started. For light powers the chain-wheel C' may be fixed directly on the wind-wheel shaft, as in dotted lines in Fig. 4.

Irregularity in the operation of the wind-wheel, and consequent irregularity in the movement of the chain E, do not affect the steady transmission of power from the power-wheel H.

When it is desired to store up power for future use—as, for instance, by allowing the chain E to be run at night—any suitable brake device may be arranged with the chain F, or with the gearing connected therewith, whereby the brake, when put on when the day's work is finished, will prevent turning of the chain F by the power-wheel H. Consequently when the power-wheel is raised by the operation of chain E, until further movement of this chain is prevented by stopping the winding of the rope O on the barrel, or by throwing the wind-wheel out of action, as hereinbefore described, the entire motor mechanism will remain at rest until the brake is taken off to allow the chain F to move, to permit rotation of the power-wheel. A brake for this purpose may consist of a friction-block, as at Y, or a band passed around a wheel fast on the shaft $d^2$ of the lower chain-wheel, $D^2$, around which the chain F travels, and controlled by any suitably-arranged lever, as at Z, by which the brake block or band may be applied or released.

Having thus fully described my invention, I claim as new and desire to secure by Letters Patent—

1. A motor comprising an upright frame, two endless vertically-traveling chains running in guides on said frame, and said guides formed with grooves $g$, to receive the chains, and with deeper grooves $g'$, and a gravitating power-wheel having teeth engaging both endless chains and entering the grooves $g'$, substantially as and for the purposes herein set forth.

2. The combination, in a motor, of an upright frame, two endless traveling chains or belts, E F, guided on the frame, a gravitating power-wheel, H, held loosely in both chains or belts, a ratchet, L, fixed to the upper chain-wheel, C', of chain E, a pawl, $l$, engaging said ratchet, a barrel, N, loosely mounted on the shaft of wheel C', and provided with a ratchet, $n$, a pawl, M, on ratchet L, engaging ratchet $n$, a weighted rope, R, connected to barrel N, and adapted to wind one way on the barrel, and a rope or cable, O, connected to the barrel and adapted to wind the other way thereon, and a rising and falling float or raft attached to rope O, substantially as shown and described.

3. In a motor, the combination, with opposite endless vertically-traveling chains and a gravitating power-wheel held loosely thereby, a barrel loose on the shaft of the wheel of the power-receiving chain, two ropes fixed to the barrel and adapted to wind reverse ways thereon, and mechanism operating the chain-wheel and barrel, substantially as specified, of an arm connected with the power-wheel and a stop on the rope giving backward rotation to the barrel, substantially as shown and described, whereby when the power-wheel is fully raised the mechanism for turning the driving-chain and chain-wheel forward will be rendered inoperative, as and for the purpose herein set forth.

4. The combination, with the opposite endless vertically-traveling chains E F, the gravitating power-wheel H, held loosely thereby, a ratchet, L, on the upper chain-wheel, C', of chain E, a pawl, M, on said chain-wheel, a barrel, N, on the shaft of wheel C', and provided with a ratchet, $n$, and ropes R O, fixed to the barrel and adapted to wind reverse ways thereon, substantially as specified, of an arm, as at T $t$, on the power-wheel support, and a stop, as at $r$, on the rope R, substantially as and for the purpose set forth.

5. A motor constructed substantially as herein shown and described, and consisting of opposite pairs of posts, C C D D, erected on a pier, A, over rising and falling water, opposite endless chains E F, fitted to upper and lower chain-wheels, C' C² D' D², respectively, and guided on said posts, a weighted power-wheel, H, held loosely in and by the endless chains, a ratchet, L, on chain-wheel C', a pawl, l, engaging said ratchet, a barrel, N, loose on the shaft of wheel C' and provided with a ratchet, n, a pawl, M, on ratchet L, engaging ratchet n, a weighted rope, R, attached to the barrel and provided with the stop r, an arm, T t, on the power-wheel support adapted to strike stop r and lift rope R, a float or raft connected to rope O and adapted to rise and fall with the water, and mechanism connected to the endless chain F, and adapted to transmit power therefrom, substantially as herein set forth.

ISAAC ST. CLAIR GOLDMAN.

Witnesses:
 JOHN C. PLATT,
 JOHN ROBARTS.